W. S. ACKEN.
SHIELD FOR GLASSES.
APPLICATION FILED APR. 29, 1919.
1,323,805.
Patented Dec. 2, 1919.
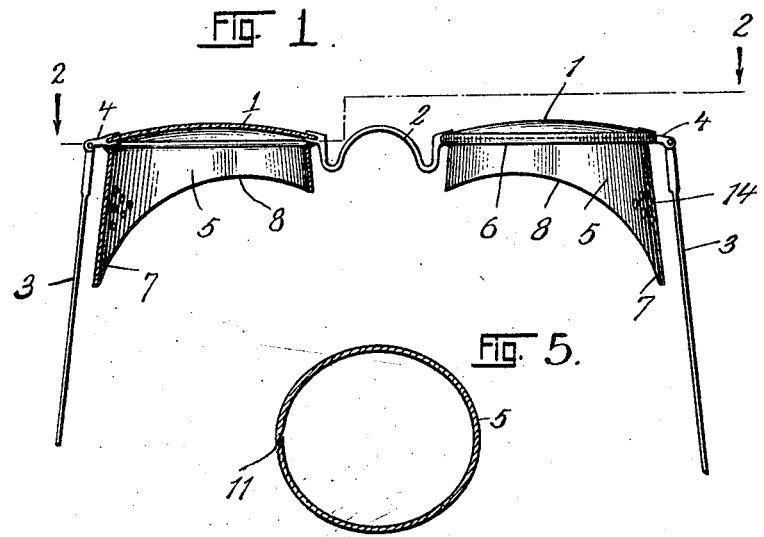
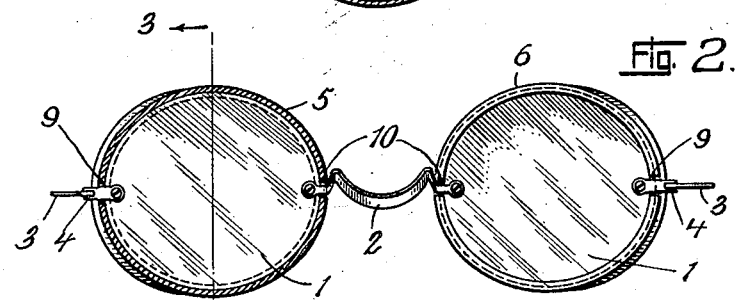
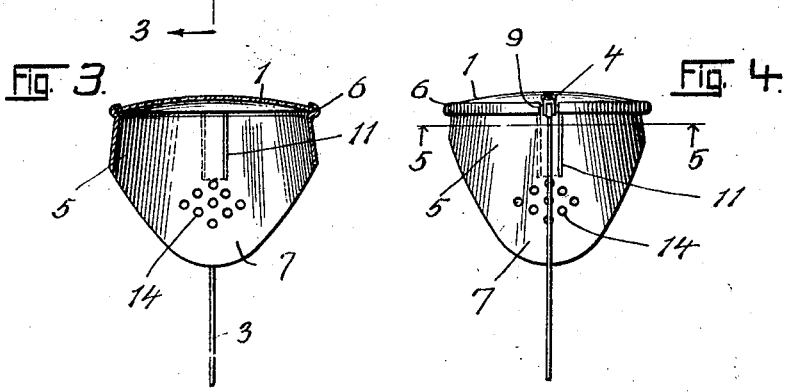
INVENTOR
Wiley S. Acken
BY
ATTORNEY

UNITED STATES PATENT OFFICE.

WILEY S. ACKEN, OF JERSEY CITY, NEW JERSEY.

SHIELD FOR GLASSES.

1,323,805.  Specification of Letters Patent.  Patented Dec. 2, 1919.

Application filed April 29, 1919. Serial No. 293,514.

*To all whom it may concern:*

Be it known that I, WILEY S. ACKEN, a citizen of the United States, residing at Jersey City, New Jersey, have invented certain new and useful Improvements in Shields for Glasses, of which the following is a specification.

This invention relates to an eye shield for spectacles whereby ordinary spectacles may be provided with eye guards.

The invention has for an object to provide a novel form of eye shield of extreme simplicity of construction and capable of being attached to, or detached from, an ordinary pair of spectacles with a minimum of effort.

For further comprehension of the invention and of the objects and advantages thereof, reference will be had to the following description and accompanying drawings, and to the appended claims in which the various novel features of the invention are more particularly set forth.

Figure 1 of the drawings is a top edge view, partly broken away of a pair of spectacles having my improved shields applied thereto.

Fig. 2 is a section on the line 2—2 of Fig. 1.

Fig. 3 is a transverse section on the line 3—3 of Fig. 2.

Fig. 4 is a side view.

Fig. 5 is a section on the line 5—5 of Fig. 4, but showing only the shield.

In the drawings I have shown my invention applied to a pair of rimless spectacles of ordinary type comprising the lenses 1, nose piece 2, and ear pieces or "bows" 3, the latter being hinged to the usual hinge parts 4.

I provide a separate shield for each lens, each shield comprising an annular member 5 adapted to surround the lens at its forward end where it is pressed out into the form of a beading 6 adapted to clip over the edge of the lens and hold the shield in position, the interior of the beading providing a recess in which the edge of the lens engages.

The shields preferably flare slightly outwardly from their forward ends and the sides thereof adjacent the bows 3 are extended rearwardly as at 7 to inclose the eye at this side, the rear edge of the shield being concaved as at 8 to fit the contour of the face.

When in position the shields are located inside the bows 3, being clipped over the lenses from the inner sides of the latter and to accommodate the hinges 4, and the ends of the nose piece 2 respectively, the beading 6 is notched as at 9 and 10.

To enable the shield to be clipped over the lenses as just set forth slots 11 are cut in the sides thereof adjacent the bows 3, which slots extend inwardly from the notches 9. These slots as shown are cut diagonally through the wall of the shields, this arrangement preventing admission of light therethrough and permitting of the shield being clipped on lenses of slightly varying diameter without presenting an opening at the edge of the lens at which point an opening would be within the range of vision and have a consequent disturbing effect.

To provide for free access of air to the interior of the shield when in use, a series of small openings 14 are formed in the extended side portions 7, these openings being out of the range of vision and in a location where there will be no liability for dust to pass therethrough into the eye.

As will be apparent from the foregoing description my improved eye shields are of extremely simple construction and may be readily attached to or detached from any ordinary pair of spectacles, and when in position form an efficient shield for the eye.

What I claim as my invention and desire to protect by Letters Patent of the United States is as follows:

1. A shield for spectacles comprising an annular member pressed out at its forward edge to form a beading adapted to clip over the lens of the spectacles and increasing in diameter from its front edge rearwardly, said member having a slot formed therein extending rearwardly from the said front edge, said slot extending only a part of the distance from front to rear edge of the shield.

2. A shield for spectacles comprising an annular member pressed out at its forward edge to form a beading adapted to clip over the lens of the spectacles, said member having a slot extending rearwardly from the said forward edge, said slot being cut diagonally through the wall of the member from outer to inner surface thereof.

3. A shield for spectacles comprising an annular member pressed out at its forward edge to form a beading adapted to clip over the lens of the spectacles, and increasing in diameter from its front edge rearwardly, said member being longer from front to rear edge on one side thereof than on the other side, and having a slot formed therein in the said longer side and extending rearwardly from the said front edge, said slot extending only a part of the distance from front to rear edge of the shield.

4. A shield for spectacles comprising an annular member pressed out at its forward edge to form a beading adapted to clip over the lens of the spectacles, said member being longer from front to rear edge thereof on one side than the other side and having a slot formed therein in the said longer side and extending rearwardly from the said front edge, said slot being cut diagonally through the wall of the member.

5. A shield for spectacles comprising an annular member, pressed out at its forward edge to form a beading adapted to clip over the lens of the spectacles, notches formed in said beading, said member having a slot extending rearwardly from the said forward edge, said slot extending only a part of the distance from front to rear edge of the shield.

In testimony whereof, I have signed my name to this specification in the presence of two subscribing witnesses, this 19th day of March, 1919.

WILEY S. ACKEN.

Witnesses:
W. F. STOHLMAN,
DELLA LEONARD.